(12) United States Patent
Yendluri

(10) Patent No.: US 10,044,808 B2
(45) Date of Patent: Aug. 7, 2018

(54) HETEROGENEOUS CLOUD-STORE PROVIDER ACCESS SYSTEMS, AND/OR ASSOCIATED METHODS

(71) Applicant: Software AG USA, Inc., Reston, VA (US)

(72) Inventor: Prasadarao Yendluri, San Jose, CA (US)

(73) Assignee: SOFTWARE AG USA, INC., Reston, VA (US)

( * ) Notice: Subject to any disclaimer, the term of this patent is extended or adjusted under 35 U.S.C. 154(b) by 227 days.

(21) Appl. No.: 13/721,893

(22) Filed: Dec. 20, 2012

(65) Prior Publication Data

US 2014/0181301 A1 Jun. 26, 2014

(51) Int. Cl.
*H04L 29/08* (2006.01)
*G06F 9/50* (2006.01)
*G06F 9/54* (2006.01)

(52) U.S. Cl.
CPC .......... *H04L 67/14* (2013.01); *G06F 9/5072* (2013.01); *G06F 9/541* (2013.01)

(58) Field of Classification Search
CPC ..... H04L 67/10; H04L 67/14; H04L 67/1097; G06F 3/14; G06F 21/6218; G06F 9/541; G06F 9/5072; G06Q 10/06; G06Q 10/10
USPC ................................ 709/203, 217, 223, 225
See application file for complete search history.

(56) References Cited

U.S. PATENT DOCUMENTS

| 6,275,944 B1* | 8/2001 | Kao ........................ G06F 21/41 |
| | | 709/229 |
| 2007/0277110 A1* | 11/2007 | Rogers ................... G06Q 10/10 |
| | | 715/736 |
| 2010/0042720 A1* | 2/2010 | Stienhans et al. ............ 709/226 |
| 2010/0161759 A1* | 6/2010 | Brand ................. H04L 67/1097 |
| | | 709/218 |
| 2010/0287219 A1* | 11/2010 | Caso ................. G06F 17/30094 |
| | | 707/827 |
| 2010/0332818 A1* | 12/2010 | Prahlad ............... G06F 17/3002 |
| | | 713/150 |
| 2011/0022642 A1* | 1/2011 | deMilo ............. G06F 17/30082 |
| | | 707/805 |

(Continued)

OTHER PUBLICATIONS

Parameswaran, A. V., and Asheesh Chaddha. "Cloud interoperability and standardization." SETlabs briefings 7.7 (2009): 19-26.*

(Continued)

*Primary Examiner* — Ranodhi N Serrao
(74) *Attorney, Agent, or Firm* — Nixon & Vanderhye P.C.

(57) ABSTRACT

In certain example embodiments, heterogeneous cloud-store provider access systems (HCPAS), and/or associated methods, are provided. Certain example embodiments provide users with managed access to cloud stores distributed across multiple, disparate providers, in a device-independent manner. A common API and user-friendly user interface allow for a single sign-on access to the various providers. Advantageously, users need not download and install differing cloud store provider access software for each provider, device, and/or provider-device combination, used to access the cloud drives. Instead, by using the HCPAS, a user can manage the distributed storage and provide improved common access, e.g., in terms of administrative and operational functions.

23 Claims, 8 Drawing Sheets

(56) References Cited

U.S. PATENT DOCUMENTS

| | | | |
|---|---|---|---|
| 2011/0061090 A1 | 3/2011 | Gillespie et al. | |
| 2011/0093471 A1* | 4/2011 | Brockway | G06F 17/30616 707/747 |
| 2011/0277027 A1* | 11/2011 | Hayton | H04L 63/0815 726/8 |
| 2012/0023201 A1* | 1/2012 | Gideon et al. | 709/219 |
| 2012/0047239 A1* | 2/2012 | Donahue et al. | 709/220 |
| 2012/0102486 A1 | 4/2012 | Yendluri | |
| 2012/0303736 A1* | 11/2012 | Novotny | H04L 67/1097 709/213 |
| 2013/0138810 A1* | 5/2013 | Binyamin et al. | 709/225 |
| 2013/0185431 A1* | 7/2013 | Venkatesh | G06F 9/5072 709/226 |
| 2013/0204849 A1* | 8/2013 | Chacko | G06F 3/0604 707/692 |
| 2013/0219050 A1* | 8/2013 | Park et al. | 709/224 |
| 2013/0304797 A1* | 11/2013 | Warren et al. | 709/203 |
| 2013/0318582 A1* | 11/2013 | McCann et al. | 726/7 |
| 2014/0019516 A1* | 1/2014 | Banerjee et al. | 709/203 |

OTHER PUBLICATIONS

Petcu, Dana, et al. "Building an interoperability API for sky computing." High Performance Computing and Simulation (HPCS), 2011 International Conference on. IEEE, 2011.*

AMI Basics—Amazon Elastic Compute Cloud [retrieved Dec. 21, 2011] http://docs.amazonwebservices.com/AWSEC2/latest/UserGuide/ComponentsAMIs.html.

Open Virtualization Format (OVF)—Virtual Machines—Virtualization [retrieved Dec. 21, 2011] http://www.vmware.com/appliances/getting-started/learn/ovf.html.

Gideon Juve et al., "Automating Application Deployment in Infrastructure Clouds," 2011 Third IEEE International Conference on Cloud Computing Technology and Science, Nov. 29, 2011, pp. 658-665.

Xiaoxin Wu et al., "Jump-Start Cloud: Efficient Deployment Framework for Large-Scale Cloud Applications," Feb. 9, 2011, pp. 112-125.

Mark Wallis et al., "Expanding the Cloud: A Component-Based Architecture to Application Deployment on the Internet," 2010 10th IEEE/ACM International Conference on Cluster, Cloud and Grid Computing, May 17, 2010, pp. 569-570.

Pei Fan et al., "Toward Optimal Deployment of Communication-Intensive Cloud Application," 2011 IEEE 4th International Conference on Cloud Computing, Jul. 4, 2011, pp. 460-467.

Rui Han et al., "A Deployment Platform for Dynamically Scaling Applications in the Cloud," 2011 Third IEEE International Conference on Cloud Computing Technology and Science, Nov. 29, 2011, pp. 506-510.

IP.com Prior Art Database, "Cloud Instance Role System to Trigger Application Deployment Dynamically," Nov. 1, 2011.

Vincent C. Emeakaroha et al., "SLA-Aware Application Deployment and Resource Allocation in Clouds," 2011 35th Annual Computer Software and Applications Conference Workshops, Jul. 18, 2011, pp. 298-303.

Otixo: All Your Cloud Files From a Single Login. Retrieved Dec. 10, 2012. http://otixo.com/.

Otixo: Product and Features. "Your Dashboard for the Cloud." Retrieved Dec. 10, 2012. http://otixo.com/product.

Otixo: Spaces. "Collaborate without Boundaries." Retrieved Dec. 10, 2012. http://otixo.com/spaces.

Otixo: The Blog. "CX Blog About Denver Startup Week & DEMOgala." Retrieved Dec. 10, 2012. http://blog.otixo.com/.

Otixo: Security. "Your Security." Retrieved Dec. 10, 2012. http://otixo.com/security.

Otixo: The Blog. "Otixo for your Desktop." Retrieved Dec. 11, 2012. http://blog.otixo.com/2011/04/.

CrunchBase. Otixo. Retrieved Dec. 11, 2012. http://www.crunchbase.com/company/otixo.

AppAppeal. Otixo-Cross Service File Manager. Retrieved Dec. 11, 2012. http://otixo.appappeal.com/.

Apple iCloud. Retrieved Dec. 20, 2012. http://www.apple.com/icloud/.

Amazon Cloud Drive. Retrieved Dec. 20, 2012. https://www.amazon.com/gp/feature.html?ie=UTF8&docId=1000796931&ref_=cd_lm_rd_fp.

Google Drive. Retrieved Dec. 20, 2012. https://www.google.com/intl/en_US/drive/start/index.html?authuser=0.

SkyDrive from Microsoft. Retrieved Dec. 20, 2012. http://windows.microsoft.com/en-US/skydrive/download.

Dropbox. Retrieved Dec. 20, 2012. https://www.dropbox.com/pricing.

LiveDrive: Cloud Storage for Everyone. Retrieved Dec. 20, 2012. http://www.livedrive.com/?tid=adwordsnewussearchbrand&gclid=CPWCn9L2irICFQXhQgodVXcATQ.

* cited by examiner

HETEROGENEOUS CLOUD-STORE PROVIDER ACCESS SYSTEMS, AND/OR ASSOCIATED METHODS

CROSS-REFERENCE TO RELATED APPLICATION

This application incorporates the entire contents of U.S. application Ser. No. 13/335,205, filed on Dec. 22, 2011.

FIELD OF THE INVENTION

Certain example embodiments described herein relate to heterogeneous cloud-store provider access systems, and/or associated methods. In certain example embodiments, single sign-on server based access systems and/or methods are provided, together with a common access application programming interface (API) for managing storage across differing cloud storage systems spread over a distributed heterogeneous environment. Advantageously, the user need not download and install differing cloud store provider access software for each provider, device, and/or provider-device combination, used to access the cloud drives. It will be appreciated, then, that certain example embodiments provide a framework for managing the storage in a distributed cloud, even where multiple, disparate cloud-store providers are present.

BACKGROUND AND SUMMARY OF EXAMPLE EMBODIMENTS OF THE INVENTION

In the computer systems architecture world, cloud computing has recently received some attention. Although there are many competing definitions for "cloud computing," it generally involves (1) the delivery of computing as a service rather than a product, and (2) providing shared processing and/or storage resources, software, information, etc., to computers and other devices as an oftentimes metered service over a network (typically the Internet). In a cloud computing environment, end users do not necessarily need to know the physical location and configuration of the system that delivers the services. Applications typically are delivered to end-users as the service, enabling transparent access to the cloud-based resources.

More and more cloud drive providers (also sometimes called cloud store providers) are coming "online." Cloud drives/cloud stores simply refer to hosted cloud content. While the proliferation of more providers is desirable for a number of reasons (related, for example, to the concomitant proliferation of different options and the services and features that each may provide), there is an emerging problem related to the ease with which a typical consumer or end user can manage his or her accounts. For instance, through natural use over time and/or interactions with others, an end user may need or end up with accounts with multiple cloud storage providers, potentially for the same (e.g., music, whether provided in MP3, MP4, or other format) or different types of media (including heterogeneous forms media such as, for example, eBooks, music, videos, personal photos, etc.)—and/or other information (such as, for example, personal computer data, back-up files, etc.). In this regard, a typical end user today might have to manage accounts associated with Apple iCloud, an Amazon Cloud Drive, Google Drive, Microsoft's SkyDrive, Dropbox, livedrive, Flickr, etc.

The end user might also be deliberately establishing accounts with multiple providers to take advantage of free cloud storage facilities offered by some cloud store providers. For instance, Amazon Cloud Drive offers 5 GB of free storage, SkyDrive offers 7 GB of free storage space, Google Drive offers 5 GB of free storage, etc. To access further storage beyond the free space offerings, some cloud store providers require users to subscribe to a paid service. For some would-be consumer-users, the free cloud storage space provided by a single provider may or may not constitute sufficient storage space, but aggregated free storage space from multiple cloud store providers together sometimes could possibly provide sufficient storage space. Unfortunately, however, the user cannot see these providers as integrated (or contiguous) storage. The user instead will need to deal with each provider separately, e.g., through the disparate interfaces (and APIs) offered by the different cloud store providers. Thus, the user not only has to deal with the peculiarities of the interfaces of the disparate cloud store providers, but also will not be able to access the storage space from different providers (for that same user) as a contiguous storage space.

In addition, it will be appreciated that regardless of whether the cloud stores are free or access on a for-pay basis, an end user might at least sometimes find it useful to be able to copy, move, and otherwise manage content between providers in a seamless fashion, while dealing with a single interface independent of a specific cloud store provider. Such functionality could be particularly valuable in scenarios where back-up, mirroring, and/or other operations, are concerned. As a specific example, a user might wish to set up automatic mirroring between two cloud store providers so that (i) it serves as a back-up for the user data in the cloud, (ii) in case of outage of one of the cloud store providers, the other mirror is available from a different cloud store provider, for the user to retrieve the data, etc. But this sort of data sharing is not easily accomplished using existing techniques and, as a result, a user cannot readily account for the scenarios of a provider outage, a provider losing the consumer data due a catastrophic event on the provider systems, etc., even if the provider is not totally inaccessible.

In this vein, an end user might find it useful in some cases to be able access integrated storage from multiple, disparate cloud store providers via disparate access methods such as, for example, from a mobile device (e.g., an iPhone or Android type device), a Tablet (e.g., an iPad, a tablet running the Android operating system, etc.), a laptop or desktop computer, etc. It would be desirable to be able to use interfaces that are similar or identical (and provide the same or similar usability experience) across all potential access devices, to the extent possible. As a simple example, a user might wish to authenticate with a single gateway but, unfortunately, users currently need to authenticate with each of the cloud drive providers each time of use, as no single sign-on like scenario is available. The requirement to install multiple software components to access the different providers can in some cases lead to incompatibilities or other conflicts and, at a minimum, may be seen as an annoyance in terms of user effort and processing resources required.

An end user also might find it useful to be able to add additional cloud store providers into, and remove unneeded and/or undesirable providers (and potentially also the associated accounts) from an integrated storage system on a dynamic basis. The latter could be from a user's desire or necessitated by a cloud store provider going out of existence (on a short notice).

Unfortunately, however, an end user currently needs to deal with "N" different providers, manage a separate account with each provider, and interact with each provider in its respective private ways. In addition, an end user oftentimes needs to install provider-specific software (e.g., drivers) and utilize device-specific interfaces with each provider, for each of the devices used.

FIG. 1 is a mesh that schematically shows device and provider specific user access to multiple, disparate cloud drive providers. FIG. 1 shows example devices 102a-102d, and example cloud providers 104a-104e. As can be seen from FIG. 1, and as alluded to above, a user will need to deal with different cloud drive providers using different provider specific interfaces and device specific access methods, each time the user needs to interact with the providers (in addition to using provider specific credentials and authentication mechanisms). As can also be appreciated from the FIG. 1 example and the description above, the user is also dealing with each provider in an isolated fashion, and there is no easy way move copy or transfer content from one provider to the other. In fact, the user does not even have an integrated view of all of the cloud content from the different providers.

It therefore will be appreciated that it would be desirable for a user to be able to interact with a single provider, or a system that mimics a single provider, that (for example) presents a more uniform interface (potentially irrespective of a specific cloud store provider), provides the ability to work seamlessly with all cloud store providers (e.g., when copying, moving, adding, removing, accessing, or otherwise managing content with respect to one or more specific cloud store providers), etc.

Perhaps more generally, it will be appreciated that there is a need in the art for techniques that facilitate uniform and integrated access to storage from disparate cloud drive providers.

In certain example embodiments, a Heterogeneous Cloud-Store Provider Access System (HCPAS), and associated methods, are provided.

An aspect of certain example embodiments relates to providing single sign-on server based access systems and/or methods, together with a common access API for managing storage across differing cloud storage systems spread over a distributed heterogeneous environment.

Another aspect of certain example embodiments thus relate to a server-side solution that manages multiple cloud store provider accounts on behalf a consumer. It may, for example, present a more uniform interface to the consumer, while dealing with different cloud store providers on behalf of the user, at the backend, using the cloud store provider specific APIs (such as, for example, the Apple iCloud API, the Amazon Cloud Drive API, the Dropbox API, the skydrive API, etc.).

Another aspect relates to using the HCPAS to manage the distributed storage and provide improved common access. Having a clear view of which files are deployed to which locations, and being able to easily transfer them from one cloud provider to another as part of managing the distributed cloud, is an advantageous feature of certain example embodiments.

In certain example embodiments, a heterogeneous cloud provider access system including a plurality of disparate cloud computing systems operated by different respective cloud providers is provided. A server comprises at least one processor. A configuration database stores a plurality of user records (potentially on a non-transitory computer readable storage medium), with each said user record indicating, for a respective user, which cloud providers the respective user has an account with and login information for each of these cloud providers. A plurality of end-user devices is provided, with each said device being connectable to the server via an application running thereon. For each of a plurality of operations requestable through an instance of the application, a mapping is defined between the respective operation and one or more provider-specific API calls associated with performance and/or execution of the respective operation, regardless of the type of the device running the instance of the application.

In certain example embodiments, a method of managing a heterogeneous cloud provider access system including a plurality of disparate cloud computing systems operated by different respective cloud providers is provided. The method comprises: storing a plurality of user records in a database, each said user record indicating, for a respective user, which cloud providers the respective user has an account with and login information for each of these cloud providers; enabling a plurality of end-user devices to connect to a server of the heterogeneous cloud provider access system via an application running on the devices, the server including at least one processor; and maintaining, for each of a plurality of operations requestable through an instance of the application, a mapping between the respective operation and one or more provider-specific methods associated with performance and/or execution of the respective operation.

In certain example embodiments, a server is connected to a heterogeneous cloud provider access system including a plurality of disparate cloud computing systems operated by different respective cloud providers. The server comprises processing resources including at least one processor. There is a connection to a database storing a plurality of user records, with each said user record indicating, for a respective user, which cloud providers the respective user has an account with and login information for each of these cloud providers. A connection pool is configured to enable a plurality of end-user devices to connect to the server via applications running on the respective devices. The processing resources are configured to at least access, for each of a plurality of operations requestable through an instance of the application, a mapping between the respective operation and one or more provider-specific application programming interface (API) calls associated with performance and/or execution of the respective operation, regardless of the type of the device running the instance of the application.

In certain example embodiments, a heterogeneous cloud provider access system including a plurality of disparate cloud computing systems operated by different respective cloud providers is provided. The heterogeneous cloud provider access system comprises a server. A configuration database is adapted for storing a plurality of user records, with each said user record indicating, for a respective user, which cloud providers the respective user has an account with and/or corresponding login information. A plurality of end-user devices is provided, with each said device being connectable to the server via an application running thereon. For each of a plurality of operations requestable through an instance of the application, a mapping is made between the respective operation and one or more provider-specific application programming interface (API) calls associated with performance of the respective operation, regardless of the type of the device running the instance of the application.

In certain example embodiments, a method of managing a heterogeneous cloud provider access system including a plurality of disparate cloud computing systems operated by different respective cloud providers is provided. A plurality of user records is stored in a database, with each said user record indicating, for a respective user, which cloud providers the respective user has an account with and/or corresponding login information. A plurality of end-user devices are enabled to connect to a server of the heterogeneous cloud provider access system via an application running on the devices. For each of a plurality of operations requestable through an instance of the application, a mapping between the respective operation and one or more provider-specific methods associated with performance of the respective operation is maintained.

In certain example embodiments, a server, adapted for being connected to a heterogeneous cloud provider access system including a plurality of disparate cloud computing systems operated by different respective cloud providers, is provided. The server includes a connection to a database adapted for storing a plurality of user records, with each said user record indicating, for a respective user, which cloud providers the respective user has an account with and/or corresponding login information. Means for enabling a plurality of end-user devices to connect to the server via applications running on the respective devices are provided. The server is adapted to at least access, for each of a plurality of operations requestable through an instance of the application, a mapping between the respective operation and one or more provider-specific application programming interface (API) calls associated with performance of the respective operation, regardless of the type of the device running the instance of the application.

Non-transitory computer readable storage mediums tangibly storing instructions for performing the above-summarized and/or other methods also are provided by certain example embodiments, as well as corresponding computer programs.

According to certain example embodiments, the server is configured to, in cooperation with its at least one processor: receive a request for an operation to be performed and/or executed with respect to one or more cloud computing systems, determine which cloud computing system(s) is/are associated with the request, identify one or more mappings needed to perform and/or execute the request based on the determination, and make any necessary API calls to the cloud computing system(s) that is/are associated with the request, in accordance with the identified one or more mappings. In other words, according to certain example embodiments, one or more provider-specific methods are caused to be performed and/or executed in connection with the cloud computing system(s) that is/are associated with the request, in accordance with the identified one or more mappings.

These features, aspects, advantages, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Certain example embodiments relate to techniques that facilitate uniform and integrated access to storage from disparate cloud drive providers. With the Heterogeneous Cloud-Store Provider Access System (HCPAS) and associated methods of certain example embodiments, a server-side solution is provided in which a user is able to register the credentials for multiple cloud drive/store provider accounts of the user. This may be done on a once-per-provider basis in some instances. Certain example embodiments therefore may manage multiple cloud store provider accounts on behalf a consumer, and present a more uniform interface to the consumer, while dealing at the backend with different cloud store providers (on behalf of the user) using the relevant cloud store provider specific APIs. Advantageously, this approach not only makes the user interface experience more uniform "across the board," but it also offers a single sign-on type authentication mechanism for the user, irrespective of how many cloud drive providers the user is utilizing. The user interface experience may also be made more uniform across all device types, as it is provided by a single provider, namely the HCPAS of certain example embodiments.

Figure 1:
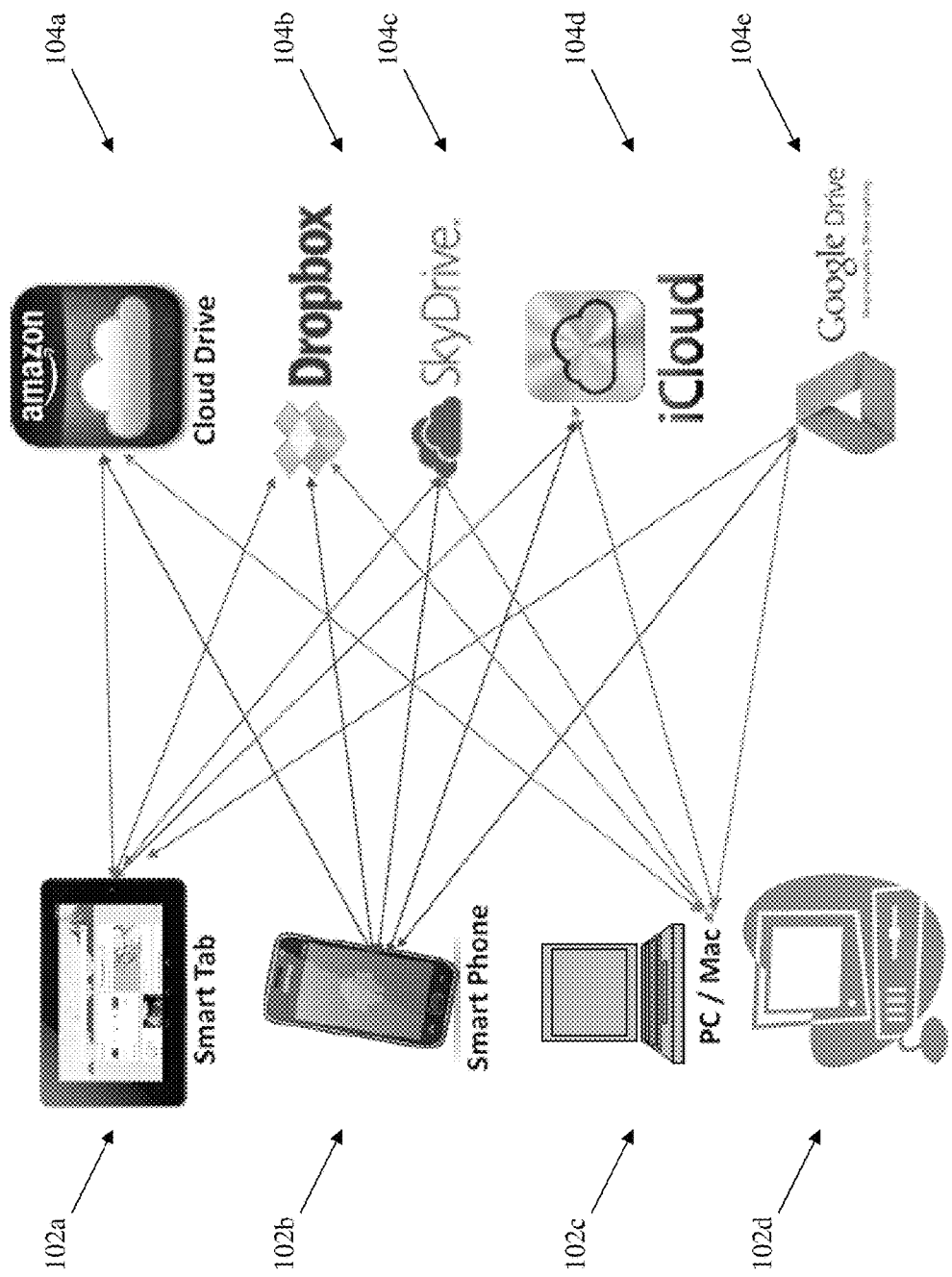
FIG. 1 schematically shows device and provider specific user access to multiple, disparate cloud drive providers.
Figure 2:
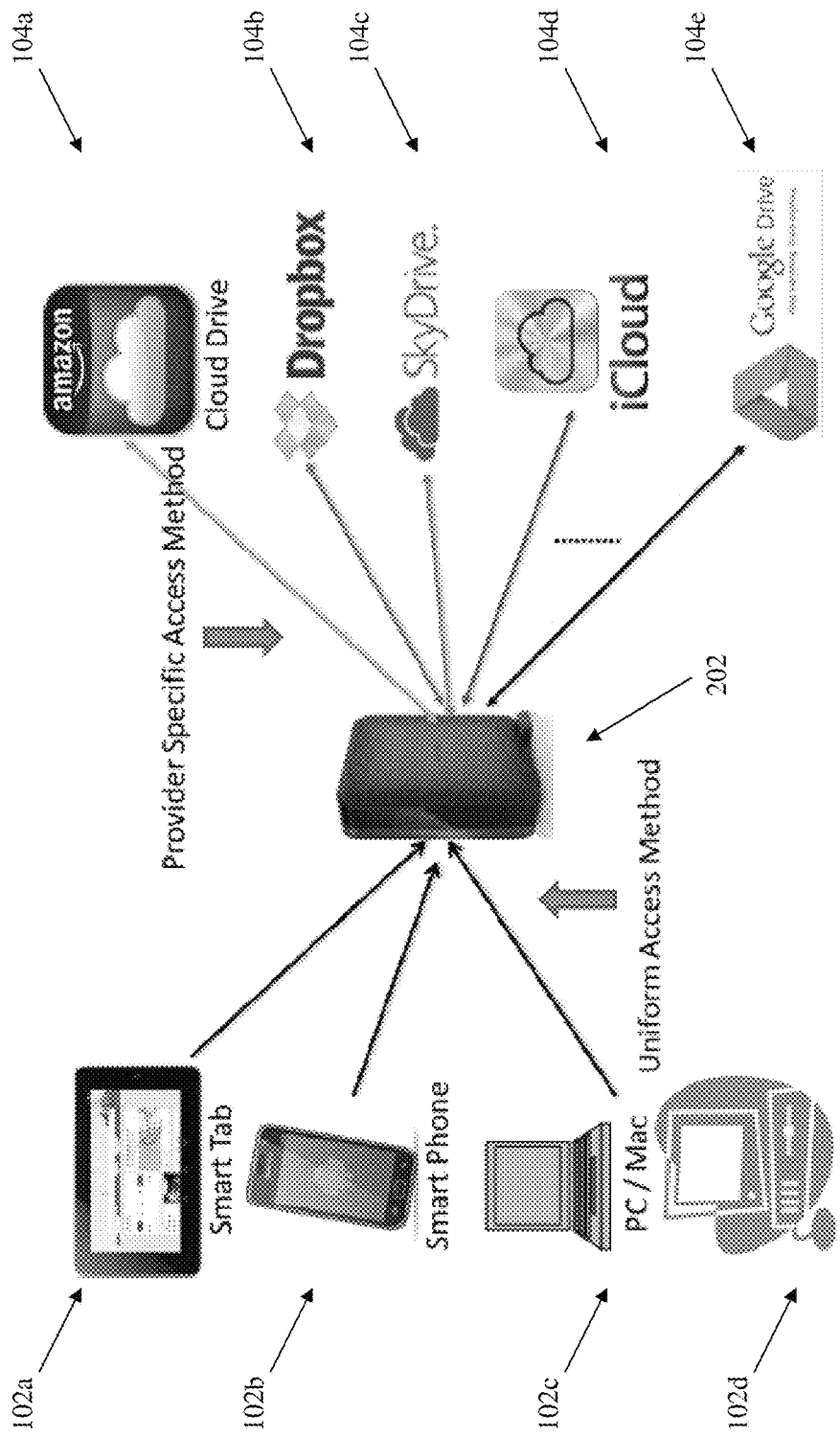
FIG. 2 schematically shows device and provider independent user access to multiple, disparate cloud drive providers, in accordance with certain example embodiments.

FIG. 2, which schematically shows device and provider independent user access to multiple, disparate cloud drive providers, in accordance with certain example embodiments, graphically depicts these example concepts. As can be seen from FIG. 2, the devices 102a-102d can access the HCPAS 202 via a uniform access method and with a more consistent user interface experience, regardless of the device type. The HCPAS 202 handles provider specific access to the various cloud providers 104a-104e on behalf of the user, regardless of the device type accessing the HCPAS 202.

Certain example embodiments may enable all suitably connected cloud drives to appear as folders under a root view for the user, e.g., on a device logged into the HCPAS. The content for each drive may be listed under each folder, as organized by the user (and the cloud drive provider). The user may be able to use this representation to copy, move, or otherwise manage files, e.g., by copying files from the device's local storage to any cloud drive location, by copying or moving files between cloud drives (e.g., by using the corresponding folder representations in the user's view), etc.

Figure 3:
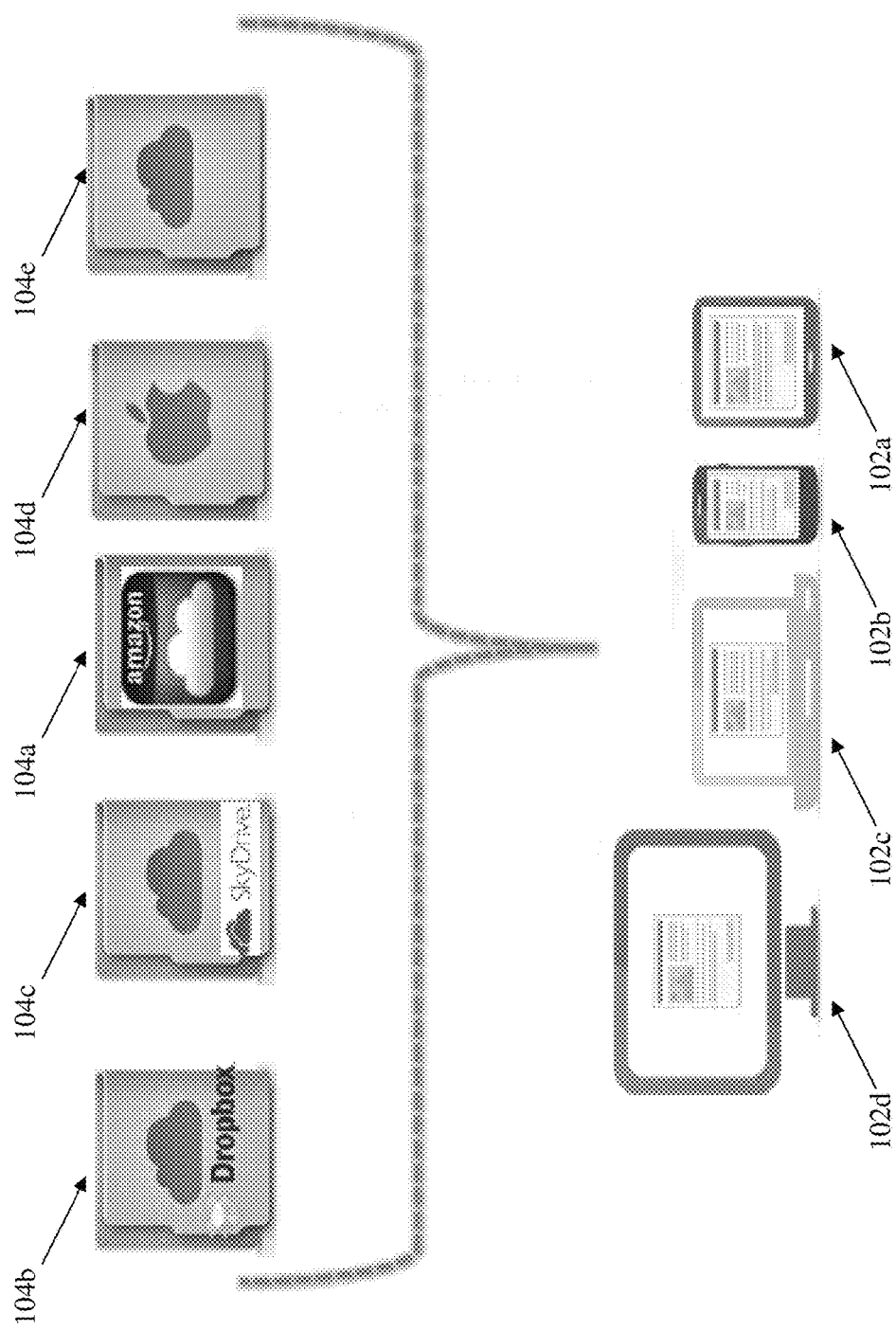
FIG. 3 is a schematic view of how the contents of disparate cloud drives can be represented as a folder view on and/or across many different user devices in a generally consistent manner, in accordance with certain example embodiments.

FIG. 3 illustrates this concept. That is, FIG. 3 is a schematic view of how the contents of cloud drives from the disparate providers 104a-104e can be represented as a folder view on and/or across many different user devices 102a-102d in a generally consistent manner, in accordance with certain example embodiments.

Figure 4:
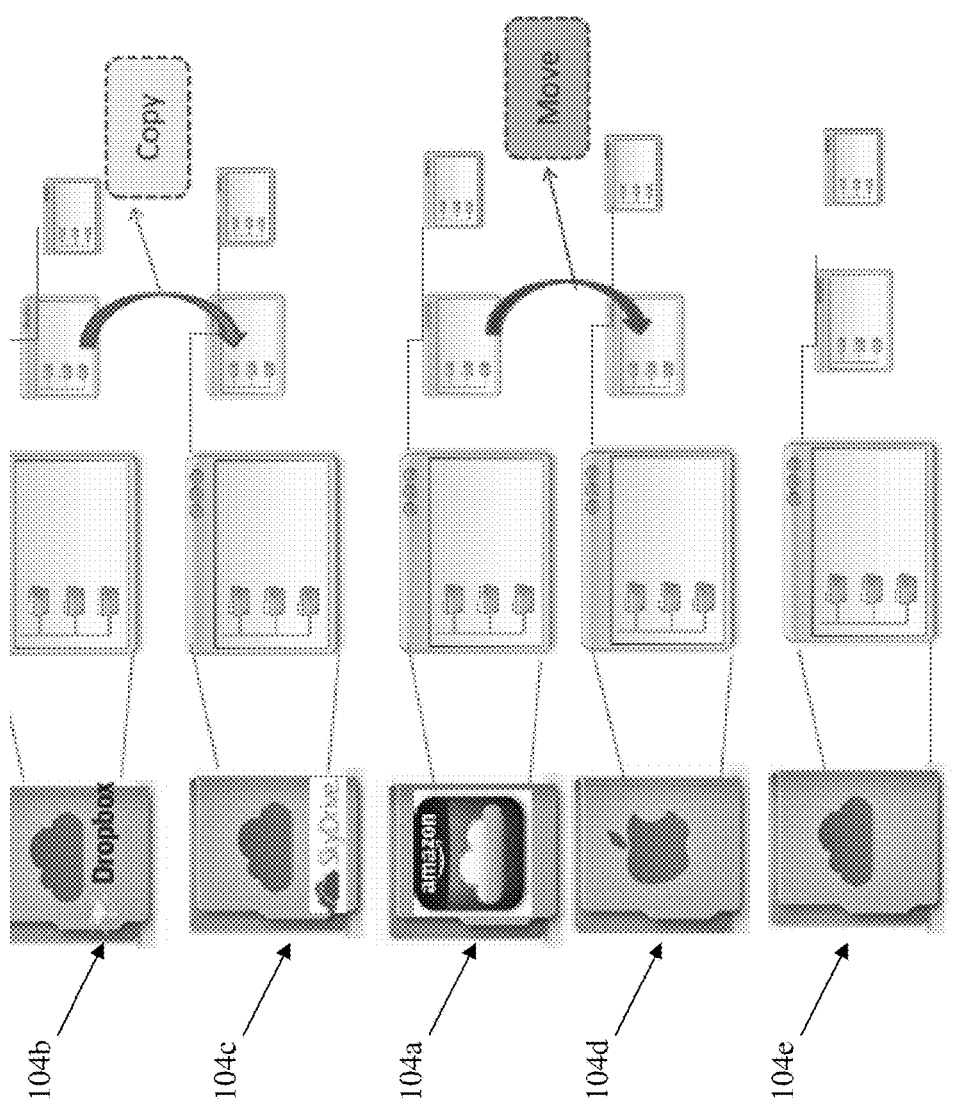
FIG. 4 shows how multiple cloud drives can be represented in a consistent folder hierarchy in certain example embodiments.

FIG. 4 shows how multiple cloud drives can be represented in a consistent folder hierarchy in certain example embodiments and, more particularly, shows example copy and move operations between different drives. As illustrated in FIG. 4, when a cloud drive folder is open, the folder hierarchy and the hierarchy of folders and files within it can be browsed by the user. Conceptual copy and move operations between different cloud drives operated by different providers are shown in FIG. 4. It will be appreciated that the copy and move operations may be accomplished in different ways depending on, for example, the cloud drives and cloud provider APIs involved, the specific operation requested, etc. It also will be appreciated that performing a copy or move within folders of the same cloud drive is a simpler version of this functionality, as only one provider's cloud drive is involved. Although all drives are shown in this example, certain example embodiments may show a user one drive at a time.

In certain example implementations, a user may download an HCPAS "Cloud Drive Navigator" application to his or her smart phone, tablet device, or other computer from a suitable marketplace for the apps (e.g., Google Play, the Amazon App Store, the Apple App Store, etc.), from the HCPAS provider website, or other appropriate location. The Cloud Drive Navigator app of certain example embodiments enables user to set up an account with and connect to the HCPAS. A user may register cloud drive provider accounts during initial HCPAS setup. The list of supported cloud drive providers may be provided via a pull-down list in a menu or the like. The HCPAS verifies the user account credentials with the respective cloud drive providers and, if no errors are detected, the registered cloud drive providers may be accessed through the HCPAS.

After initial HCPAS account setup, a user may further manager his or her account, e.g., by adding further cloud storage providers, deleting existing providers, changing credentials for one or more of the existing providers, etc. In this regards, the HCPAS application of certain example embodiments may have management of account and use of the cloud drives features. The account management features may enable the addition and removal of cloud drives to the account, changing the credentials for cloud drive provider, etc. The use of cloud drive features may include uploading content to a cloud drive, deleting content from a cloud drive, moving or copying content between cloud drives, etc.

In the use of cloud drive mode, the HCPAS navigation application may present a view of the cloud drives (e.g., as depicted in and described in connection with FIGS. 3-4). It also may provide the ability to browse and select content local to the device connected to the HCPAS. Users thus may be able to upload content from a local device to a cloud drive, e.g., by simply copying the local content to a folder on the cloud drive (in HCPAS presented view) via a drag-and-drop or other suitable technique.

In certain example embodiments, the HCPAS also may provide log and security audit facilities, e.g., for activities conducted via the HCPAS.

EXAMPLE IMPLEMENTATION

As alluded to above, an HCPAS provider may create a client-side application (referred to herein as the HCPAS Navigator) that will interact with the HCPAS server. As indicated above, the HCPAS Navigator may have functionality suitable for (for example) managing the client account with the HCPAS server, registrating cloud drive provider accounts, and managing cloud driver account lifecycles (such as, for example, adding more cloud drive provider accounts; removing cloud drive provider accounts; modifying cloud drive provider accounts through change of log-in credentials, etc.; and/or the like). The HCPAS Navigator application also may include features for accessing and managing the content on the cloud drive providers. A suitable HCPAS Navigator application may be created in connection the standard software development kits (SDKs) provided by the device OS providers (such as, for example, the Android SDK, the Apple iPad SDK, etc.).

With the initial setup, the HCPAS server may set up the user credentials and present the user with a list of cloud drive providers supported by the HCPAS server. The HCPAS server may record the credentials for the user associated with the each cloud drive the user wishes to work with.

Figure 5:
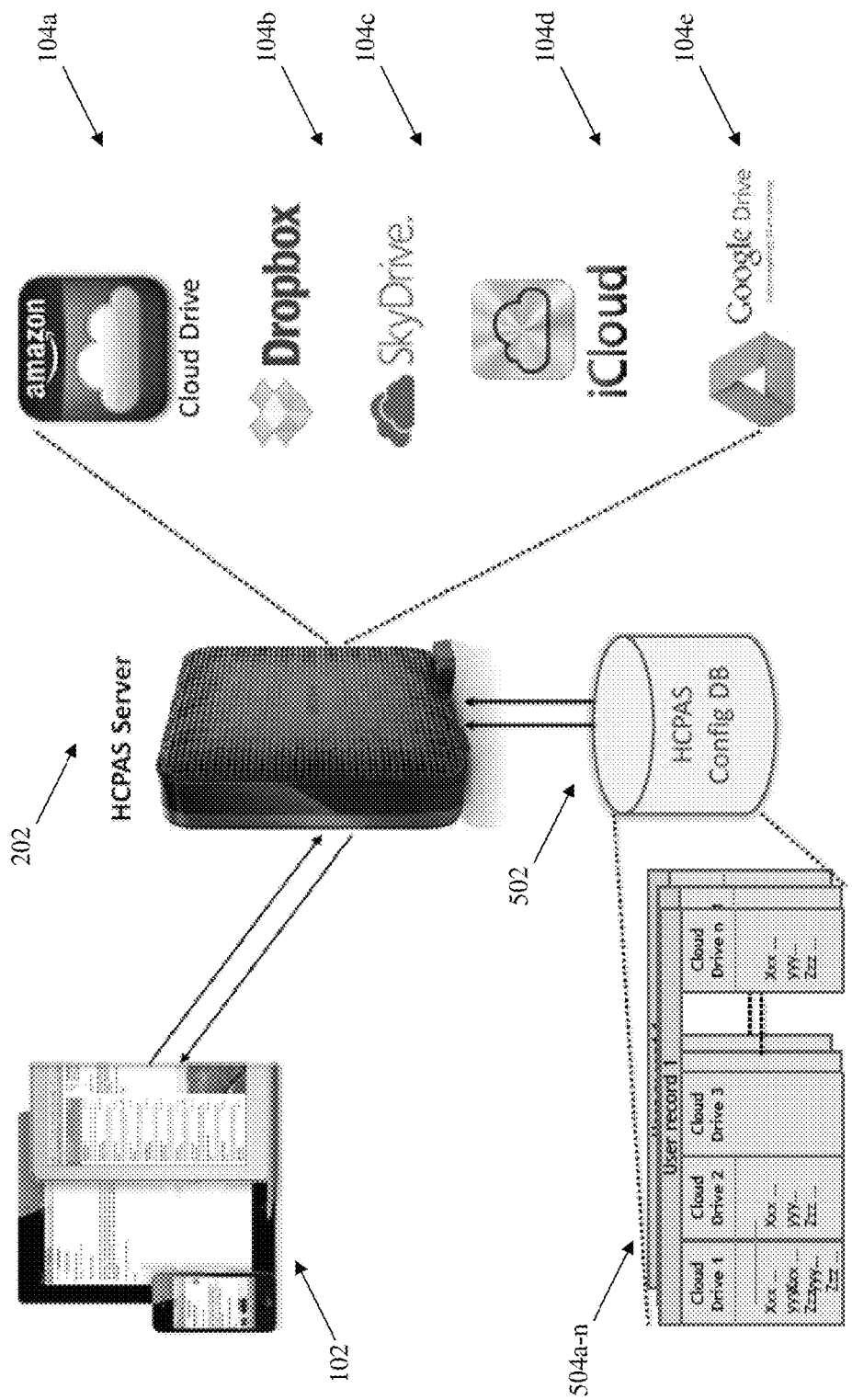
FIG. 5 is a block diagram schematically illustrating a setup operation in connection with a Heterogeneous Cloud-Store Provider Access System (HCPAS) server, in accordance with certain example embodiments.
Figure 6:
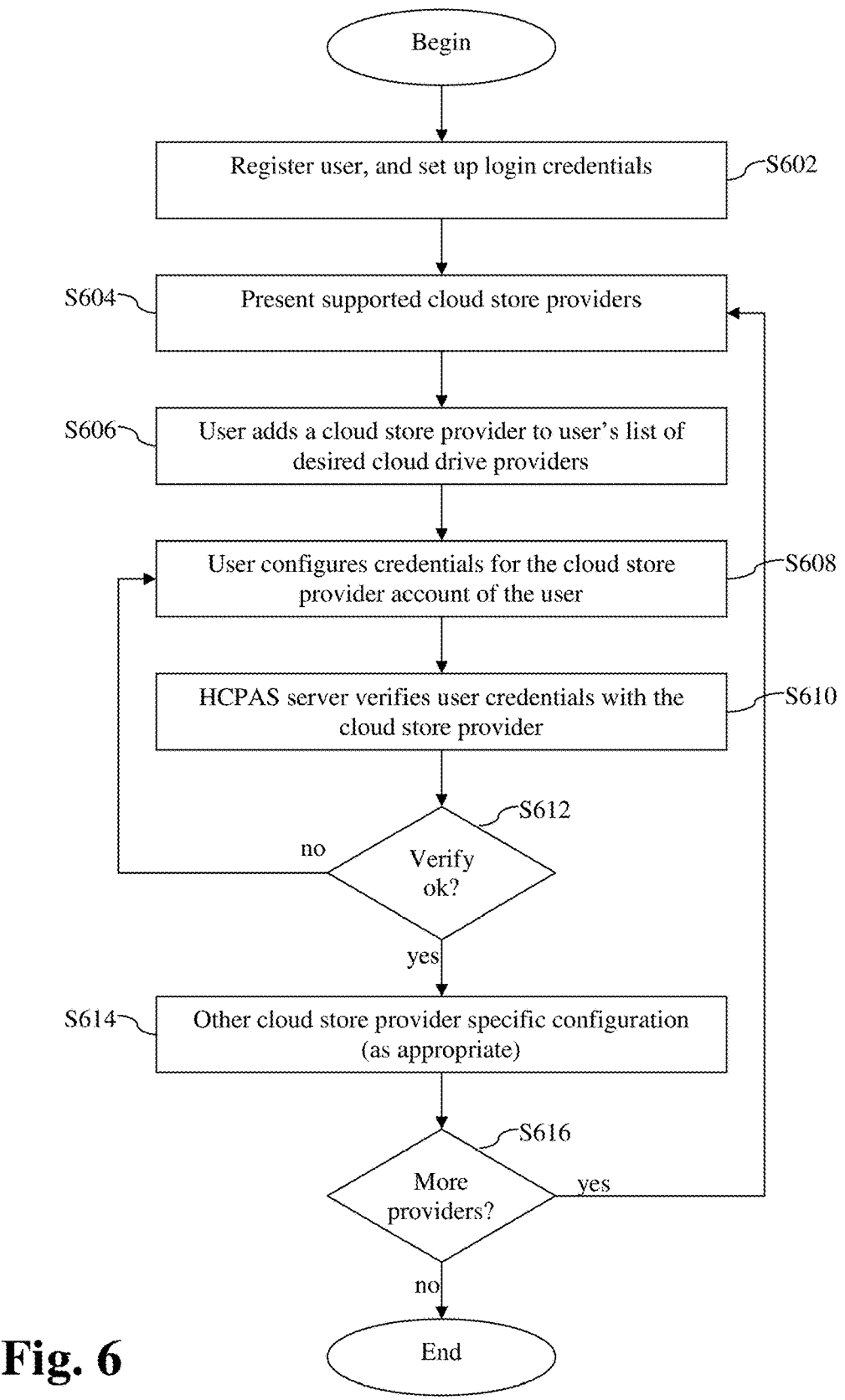
FIG. 6 is a flowchart illustrating example steps that may be associated with a setup operation in connection with an HCPAS server, in accordance with certain example embodiments.

FIG. 5 is a block diagram schematically illustrating a setup operation in connection with an HCPAS server, in accordance with certain example embodiments, and FIG. 6 is a flowchart illustrating example steps that may be associated with a setup operation in connection with an HCPAS server, in accordance with certain example embodiments. A user, using a device 102, registers with and sets up login credentials for the HCPAS server 202 (step S602). The user is presented with a list of supported could store providers 104 (step S604), and the user may add a cloud store provider to user's list of desired cloud drive providers (step S606), and the user may configure credentials for the cloud store provider (step S608). This may cause a corresponding entry to be created in the HCPAS configuration database 502, which includes a plurality of user records 504a-n. Individual records 504 may, for an associated user, indicate which cloud drives are to be connected, what their login credentials are, provide type and/or other access information, etc. The HCPAS server may then verify the user credentials with the cloud store provider (step S610), e.g., by attempting to access the cloud drive using suitable API calls and the user's provided credentialing information (step S612). If the verification is not successful, the user may be presented with another opportunity to provide credentialing information. If there is a success, the user may be able to provide other cloud store provider specific configuration, as appropriate (step S614). If there are more providers to be added, the process loops back to step S604. Otherwise, the process is ended.

In the table 504, one record is created for each user and, thus, a total of "n" records will be provided for the "n" users registered in the system. Each user-record includes one entry each cloud-drive the user configured during set-up process. In the example shown in FIG. 5, each column in a specific user's record will correspond to a specific cloud drive provider the user registered. For instance, if a user identified as "user-1" in the HCPAS has set up four different cloud drive providers for access, the user would have four columns in the user record. Because different users can set up different combinations of cloud drive providers and in any sequence, a first user's cloud-1 drive entry might correspond to a cloud drive that is different than the cloud-1 drive of a different user. Each column corresponding to a specific cloud drive will have the cloud drive provider's identity, access URL(s), user credentials corresponding to the cloud drive, etc. In addition, each column may also point to a decision table or other mapping structure that maps user operations as defined by the HCPAS to corresponding operations on the pertinent cloud drive provider. Further exemplary detail about this functionality is provided below.

A wide variety of operations may be supported for and/or via the HCPAS Cloud Drive Navigator. This may include the following and/or other administrative operations:

[Login]/[Logout]→Log into or out of the HCPAS server
[Add Provider]→Add a Cloud Driver Provider to the User Accounts
[Add Credentials]→Add user credentials for a cloud drive provider
[Modify Credentials]→Modify user credentials for a cloud drive provider
[Delete Provider]→Delete a Cloud Driver Provider to the User Accounts
[Modify Provider]→Modify a Cloud Driver Provider in the User Accounts It will be appreciated that most of these example admin operations will effect only the local configuration of the HCPAS server, e.g., via the configuration database 502. That is, they may not result in any interaction with the cloud drives 104a-e themselves. It also will be appreciated that "add credentials" and "modify credentials" operations may result in an interaction with the corresponding cloud store provider, e.g., for verification of validity of the credentials.

The following and/or other example cloud drive usage operations also may be supported in certain example embodiments:

[Copy]→Copy a selected file or folder to a destination folder on the same or different cloud drive
[Move]→Move a selected file or folder to a destination folder on the same or different cloud drive
[Delete]→Delete a selected file or folder from the selected cloud drive
[Rename]→Rename a selected file or folder on the selected cloud drive
[Create a new folder]→Create a new folder on the selected cloud drive
[Add]/[Insert]→Add a file to folder on the current (selected) Cloud Drive (which in some cases may be the same as an upload operation)
[Refresh]→Refresh the HCPAS Navigator view (e.g., refresh the folder view)
[Download]→Download a file from a cloud drive to a local storage (e.g., of the user device)
[Upload]→Upload a file to a cloud drive from a local storage (e.g., of the user device)

It will be appreciated that cloud drive usage operations likely will result in an interaction by the HCPAS server with one or more cloud drives. For example, a copy or move operation between folders on different cloud drives will result in interactions with two cloud drives.

In certain example embodiments, user data retrieved from or published to the cloud store provider need not necessarily be stored on the HCPAS (except, perhaps, temporarily during transfer and/or transition related processes). Instead, the HCPAS of certain example embodiments may simply act as a pass-through: one-to-many from consumer to the cloud-providers, or many-to-one from cloud-providers to the consumer. The HCPAS of certain example embodiments may facilitate transfer of data between providers but the user him- or herself may decide what action to take to address storage capacity limits. For example, the user may decide to delete some content not needed anymore, move some content to another provider, etc. The HCPAS of certain example embodiments therefore will not constrain or force the user to take a specific action, e.g., when storage limits are reached.

The cloud drive usage operations from the app on the user device result in equivalent operations on one or more cloud drives, as appropriate, on behalf of the user. To accomplish this, the HCPAS server may maintain a mapping for mapping operations on a cloud drive abstraction presented to the user, to the corresponding operations (and thus the relevant API call(s)) on the pertinent cloud drive provider (s). For example, if the user selects a Amazon Cloud Drive folder and later and inserts (or adds) a new file to a folder of it, the HCPAS server will execute corresponding API calls on the (real) Amazon Cloud Drive to make the insertion (addition) happen on the corresponding folder on the real Amazon Cloud Drive.

Figure 7:
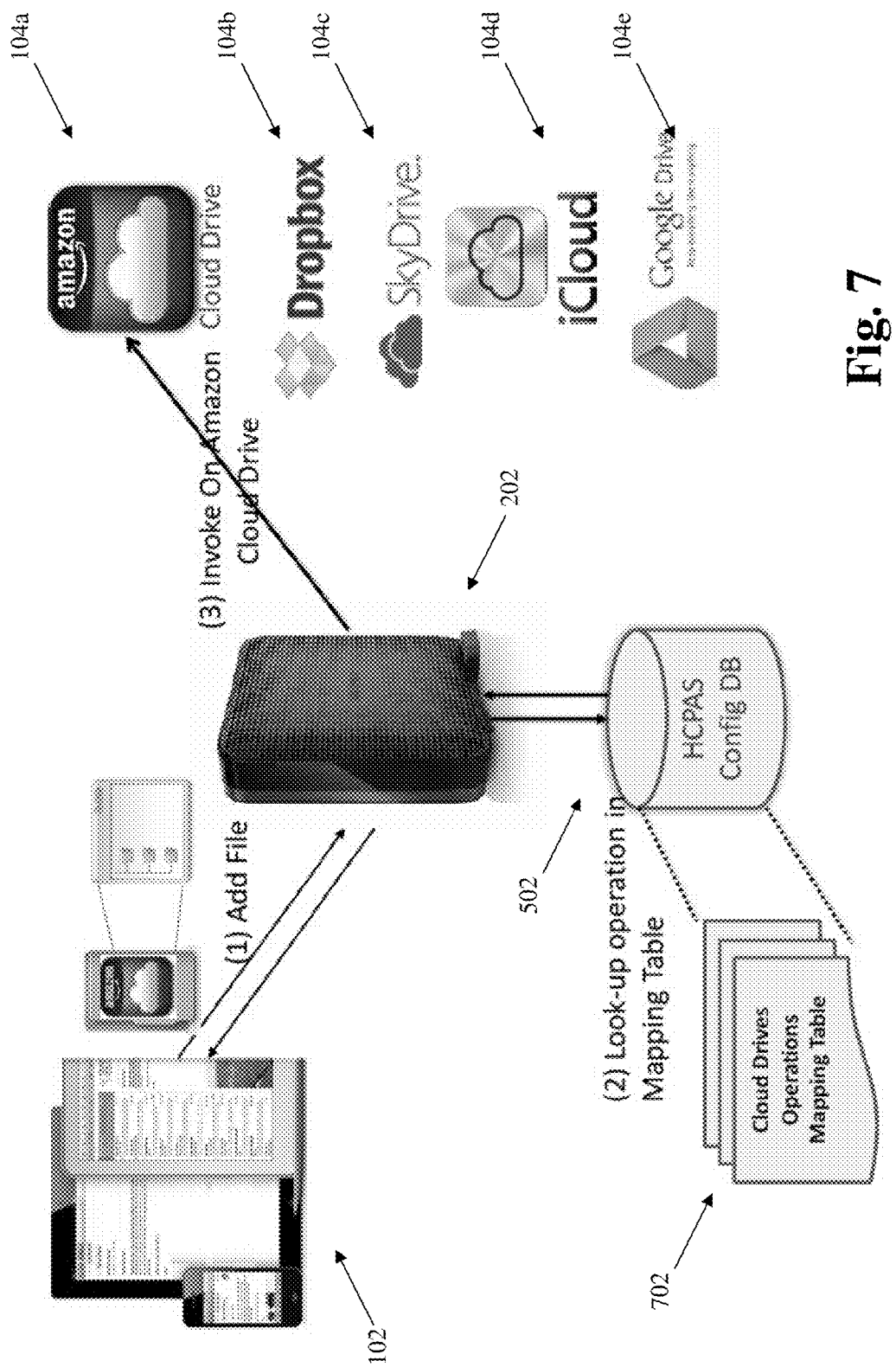
FIG. 7 illustrates an example operation invoked on a cloud drive, through the HCPAS and using a mapping, in accordance with certain example embodiments.

FIG. 7 illustrates an example operation invoked on a cloud drive, through the HCPAS and using a mapping, in accordance with certain example embodiments. Using a device 102, the user executes an "add file" operation. The "add file" operation (or other such operation received from the device 102) may include or have associated with it additional parameters that identify, for example, the cloud drive provider, the specific folder on the cloud drive, the file to be added (or modified, deleted, moved, etc.), and/or the like, based on the actual operation. This command is received via the application running on the user device 102, and sent to the HCPAS server 202. As indicated above, the instruction from the device 102 will be handled the same, regardless of the device type. However, the HCPAS server 202 will need to know how to actually execute the instruction on the appropriately implicated cloud drive(s) of the cloud provider(s) 104. Accordingly, a look-up operation may be performed on the HCPAS configuration database 502, e.g., to consult the cloud drives operations mapping 702. As alluded to above, run-time end-user operations may be mapped to the corresponding cloud drive operations using the cloud drive operations mapping 702. Thus, this mapping 702 may indicate what cloud provider specific API calls are appropriate for a given instruction or set of instructions. Once the system knows what API call(s) need(s) to be made to accomplish the desired action specified by the user device 102, the HCPAS server 202 can then make those calls an invoke the requested service or perform the corresponding operation on the appropriate cloud drive.

It will be appreciated that the mapping between the device-independent instruction and the cloud providers' commands can be integrated in the execution logic of the HCPAS, stored in a table or other structure that stores links between possible operations of the user and the corresponding operations of the cloud drive provider, etc. A look-up may be performed based on the identity of the cloud provider in the user-record. In other words, the server 202 may determine which cloud provider is implicated in a given user operation by consulting the table 504 and then use previously defined mappings to cause the appropriate actions to be invoked on the appropriate providers, regardless of whether the mappings are present in code, a table, and/or elsewhere.

As will be appreciated from this discussion, table-inclusive approaches allow information in a table to be looked up, rather than relying on predefined logic statements (such as, for example, a series of hard-coded or otherwise pre-programmed "if" statements). In simple cases, it may be quicker and easier to use logic statements. However, as the logic chain becomes more complex, table-driven code may be simpler to implement than complicated logic, easier to modify and maintain, more efficient to execute, etc. In some languages, like Ruby or Perl, this technique is straightforward. In Java, Reflection may be used to find method handles. In other words, known languages and/or techniques may be used to implement these and/or other related optional optimizations. In a table-based example, a table look-up of user-operation-id in the table for the cloud provider may return the corresponding operation for the cloud-provider. It is noted that the mappings may be updatable, e.g., via the HCPAS provider. Updates may be provided as new cloud providers are supported, as existing cloud providers make changes to their APIs (e.g., to add or deprecate certain functionality), when cloud providers are no longer supported, to correct known or discovered issues, and so forth.

From the foregoing, it will be appreciated that certain example embodiments will involve different cloud-drive provider specific operations (APIs) being mapped to a common HCPAS client API. Cloud-drive providers have defined REST APIs, which may make this mapping process easier and/or at least more consistent. For example, some of Google Drive operations are listed in the table below:

| Method | HTTP request | Description |
| --- | --- | --- |
| get | GET /files/fileId | To download a file's content, send an authorized HTTP GET request |
| insert | POST /files | Insert a new file |
| update | PUT /files/fileId | Updates file metadata and/or content |
| copy | POST /files/fileId/copy | Creates a copy of the specified file |
| delete | DELETE /files/fileId | Permanently deletes a file by ID |
| list | GET /files | Lists the user's files |

Figure 8:
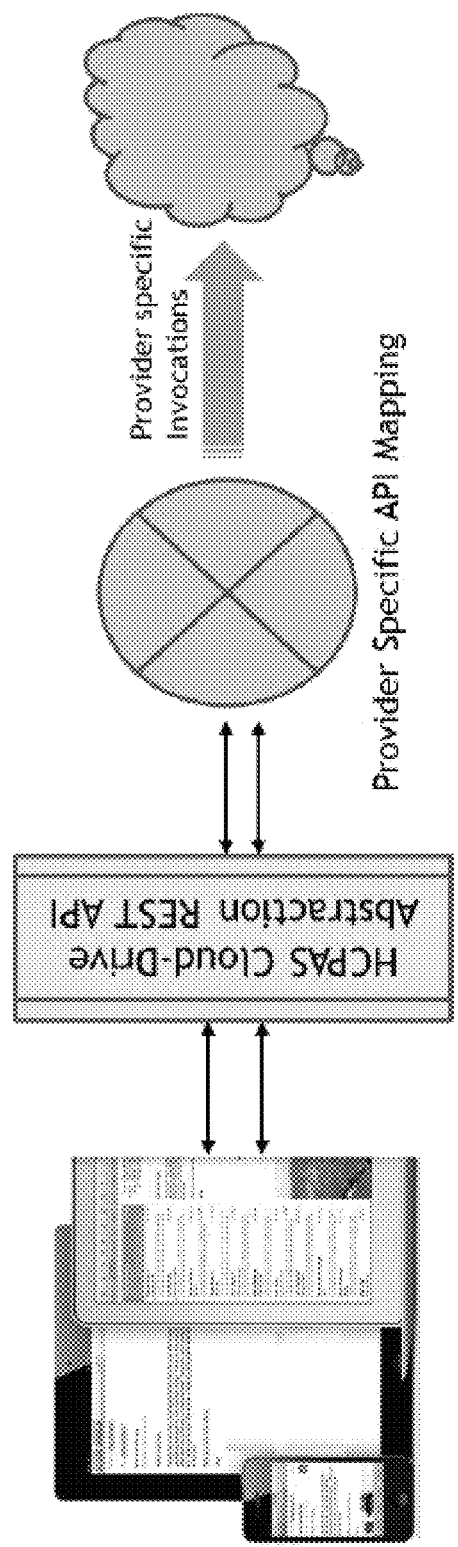
FIG. 8 schematically shows the HCPAS to specific cloud provider API mapping that may be implemented in accordance with certain example embodiments.

Other providers offer similar but slightly different APIs to suit provider-specific needs. It has been observed by the inventor, however, that they appear to be similar to one another (at least at this point) and address operations on files and folders, in addition to administrative operations (e.g., use-account management and authentication, for example). Typical operations may include some or all of the following and/or other operations:

Reading folder properties
Deleting folders
Creating folders
Updating folder properties
Reading file properties
Updating file properties
Downloading files
Uploading files
Updating uploaded files
Deleting uploaded files
Getting links to folders and files
Moving folders and files
Copying files FIG. 8 schematically shows the HCPAS to specific cloud provider API mapping that may be implemented in accordance with certain example embodiments. In other words, FIG. 8 shows the API layering between clients based on different devices, HCPAS, and heterogeneous cloud drive providers. The HCPAS provider may define an API abstraction layer that accounts for multiple cloud drive provider APIs and parameters, e.g., so that operations on any cloud drive provider can be represented effectively, with all variations of parameters possible. The REST API invocations on the HCPAS server from the user devices may be provided in this abstraction format in certain example implementations. The HCPAS server will then be able to map the operation to any (and all) cloud drives that need to be invoked to accomplish the purpose of the original operation from the user device. Consider the following two examples, which involve (1) deleting a file from could-provider-A which in this scenario is a Dropbox drive; and (2) copying a file from a source provider (Dropbox) to a target provider (Google Drive):

Example 1 delete (cloud-provider-id, folder-id, file-id)→https://api.dropbox.com/1/files DELETE <folder-path/file-path>

Example 2

Copy(source-provider-id, source-file-path, target-provider-id, target-folder-path) → https://api-content.dropbox.com/1/files/
GET <folder-path>/<file-path> (returns file-content in HTTP response body)
https://Google-drive-path POST /folder-id (upload file)
(returns the fileId)
https://Google-drive-path PATCH /file-id (set file-title)
PATCH https://www.googleapis.com/demo/v1/324
Authorization: /*Auth token goes here*/
Content-Type: application/json
{
    "title": "New title"
}

Although certain example embodiments have been described as relating to cloud stores/cloud drives, it will be appreciated that the example techniques may be applied to other cloud resources in addition to, or apart from, storage-related resources. For instance, a user may use the approach described herein to manage how processors and/or memory can be used, how and when services can be invoked (e.g., for load-balancing, failover, and/or other purposes), etc. In such instances, a common user interface will be provided (e.g., for single sign-on purposes), and the mapping may still translate instructions from the user interface in a device-independent manner and be responsible for sending the appropriate API calls to the relevant cloud providers. Furthermore, the example techniques described herein may reduce the need install software for each provider, on each of the access devices of the user, etc.; provide an alternative to having to log into each provider from each device for access every time, etc.; and/or the like.

In view of the foregoing, it will be appreciated that certain example embodiments provide techniques that facilitate uniform and integrated access to storage from disparate cloud drive providers and, more particularly, make it possible for a user to interact with a single provider, or a system that mimics a single provider, that (for example) presents a more uniform interface irrespective of a specific cloud store provider, provides the ability to work seamlessly with all cloud store providers (e.g., when copying, moving, adding, removing, accessing, or otherwise managing content with respect to one or more specific cloud store providers), etc. In this regard, certain example embodiments may provide some or all of the following and/or other advantageous features.

The end-user may be able to register and manage multiple cloud store providers accounts and associated credentials with the HCPAS of certain example embodiments. The user may authenticate with only the HCPAS but still be able to work with any of the registered cloud drive/cloud store providers, resulting in a single sign-on like experience for the user. The user need not download and install differing cloud store provider access software (if any) for each provider, device, and/or provider-device combination, used to access the cloud drives, thereby reducing the need to install "n" different cloud drive provider related software applications and potentially having to deal with device-specific issues or incompatibilities, on all devices of access.

The user may be able to transfer data between providers, and also from a provider to the consumer's device and vice versa. As indicated above, a user's device could be an iPhone, iPad, Android phone, Android tablet, a laptop or desktop computer, etc.

Users may be able to set up automatic mirroring between two cloud store providers so that, for example, so that (i) it serves as a back-up for the user data in the cloud, (ii) in case of outage of one of the cloud store providers, the other mirror is available from a different cloud store provider, for the user to retrieve the data, etc. This functionality may help reduce the likelihood of a provider losing the user's data related to a catastrophic event on the provider's systems, power outage, or the like.

It will be appreciated that as used herein, the terms system, subsystem, service, engine, module, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A heterogeneous cloud provider access system configured to communicate with a plurality of disparate cloud computing systems operated by different respective cloud providers, each said cloud computing system providing operations that are common across the plurality of disparate cloud computing systems, but each of the common operations implemented through differently implemented application programming interface (API) calls that are specific to the respective cloud computing system for those common operations, the API calls allowing external computing devices to interact with the respective cloud computing system for performance and/or execution of functionality provided by the respective cloud computing system, the heterogeneous cloud provider access system comprising:

a server computer system comprising at least one processor, and a network interface coupled to an electronic communications network;

a plurality of end-user devices, which are remotely located from the server computer system, each said end user device including at least one hardware processor, wherein communication, via the electronic communications network, with the server is carried out by using an application installed on the respective end-user device, the application including plural user selectable operations that are independent of, but correspond to, operations that are common across the plurality of disparate cloud computing systems, each user selectable operation selectable by a user for execution and/or performance in connection with at least one of the cloud computing systems after authentication with the server, wherein the plural user selectable operations include operations that involve at least two different cloud computer systems, the operations including moving data between a first cloud computer system and a second cloud computer system of the plurality of disparate cloud computing systems and copying data from the first cloud computer system to the second cloud computer system; and a configuration database stored in electronic memory of the server computer system, the configuration database configured to store:

a plurality of user records, each said user record being associated with login information for at least one of the plurality of disparate cloud computing systems; and an API definition table that includes a plurality of records that are each mapped within the configuration database to at least one of the plural user selectable operations, where each record includes an API definition specific to at least one corresponding cloud computing system, wherein the at least one processor of the server computer system is configured to cause the server computer system to:

after one of the plurality of end-user devices has been authenticated with the server, receive, from the one of the plurality of end-user devices and via the electronic communications network, a first request that includes a selected one of the plural user selectable operations and user-specified parameters for the selected operation, wherein the selected one of the plural user selectable operations involves two different cloud computer systems;

responsive to reception of the selected operation, retrieve, from the configuration database, a first API call for a first cloud computer system and a second API call for a second cloud computer system;

responsive to reception of the selected operation and based on the retrieved first API call, dynamically generate, using at least some of the user-specified parameters for the selected operation, a first invocation for the first API call;

responsive to reception of the selected operation and based on the retrieved second API call, dynamically generate, using at least some of the user-specified parameters for the selected operation, a second invocation for the second API call;

communicating the first invocation to the first cloud provider computer system to cause execution of functionality provided by the first API call;

communicating the second invocation to the second cloud provider computer system to cause execution of functionality provided by the second API call, wherein the server computer system is configured to broker electronic network communications between the plurality of end-user devices and the plurality of disparate cloud computing systems such that communications therebetween are provided via the server computer system.

2. The system of claim 1, wherein the server computer system is further configured to, in cooperation with the at least one processor:
enable users to log into the heterogeneous cloud provider access system, and
log into the respective cloud computing systems with which logged in users have accounts based on the login information stored in the configuration database.

3. The system of claim 1, wherein the application installed on the respective end-user device is configured to provide a user interface for displaying content of cloud storage locations provided to the respective cloud computing systems with which logged in users have accounts.

4. The system of claim 3, wherein the content is displayed hierarchically.

5. The system of claim 3, wherein the user interfaces provide consistent user interface experiences regardless of device type.

6. The system of claim 1, wherein the application enables users logged into the server to perform file management functions with respect to one or more cloud storage locations provided to the respective cloud computing systems with which logged in users have accounts.

7. The system of claim 6, wherein the file management functions that are performable include copying and/or moving data from a device to cloud storage locations provided to the respective cloud computing systems, and vice versa.

8. The system of claim 1, wherein the mappings are stored in a table.

9. The system of claim 1, wherein the mappings are stored as logic statements.

10. The system of claim 1, wherein the application enables users logged into the server to perform management and/or administrative functions with respect to one or more cloud resources provided to the respective cloud computing systems with which logged in users have accounts.

11. The system of claim 10, wherein the cloud resources are processing resources.

12. The heterogeneous cloud provider access system of claim 1, wherein the functionality that is common across the plurality of disparate cloud computing systems includes at least one of: 1) reading folder properties, 2) deleting folders, 3) creating folders, 4) updating folder properties, 5) reading file properties, 6) updating file properties, 7) downloading files, 8) uploading files, 9) updating uploaded files, 10) deleting uploaded files, 11) getting links to folders and files, 12) moving folders and files, and 13) copying files.

13. A method of managing a heterogeneous cloud provider access system that includes a server computer system comprising at least one processor and a network interface coupled to an electronic communications network that is configured to allow communication with a plurality of disparate cloud computing systems operated by different respective cloud providers, each said cloud computing system providing operations that are common across the plurality of disparate cloud computing systems, but each of the common operations implemented through differently implemented application programming interface (API) calls that are specific to the respective cloud computing system for those common operations, the API calls allowing external computing devices to interact with the respective cloud computing system for performance and/or execution of functionality provided by the respective cloud computing system, the method comprising:

storing, to a configuration database stored in electronic memory of the server computer system, a plurality of user records in a database, each said user record being associated with login information for at least one of the plurality of disparate cloud computing systems;

enabling a plurality of end-user devices, which are remotely located from the server with each said end user device including at least one hardware processor, to connect to the server computer system of the heterogeneous cloud provider access system via an application installed on the respective end-user device, the application including plural user selectable operations that are independent of, but correspond to, operations that are common across the plurality of disparate cloud computing systems, each user selectable operation selectable by a user for execution and/or performance in connection with at least one of the cloud computing systems after authentication with the server computer system, wherein the plural user selectable operations include operations that involve at least two different cloud computer systems, the operations including moving data between a first cloud computer system and a second cloud computer system of the plurality of disparate cloud computing systems and copying data from the first cloud computer system to the second cloud computer system;

maintaining an API definition table that includes a plurality of records that are each mapped within the configuration database to at least one of the plural user selectable operations, where each record includes an API definition specific to at least one corresponding cloud computing system;

after one of the plurality of end-user devices has been authenticated with the server computer system, receiving, at the server computer system and from the one of the plurality of end-user devices, a first request that includes a selected one of the plural user selectable operations and user-specified parameters for the selected operation, wherein the selected one of the plural user selectable operations involves two different cloud computer systems;

responsive to reception of the selected operation, retrieve, from the configuration database, a first API call for a first cloud computer system and a second API call for a second cloud computer system;

responsive to reception of the selected operation and based on the retrieved first API call, dynamically generate, using at least some of the user-specified parameters for the selected operation, a first invocation for the first API call;

responsive to reception of the selected operation and based on the retrieved second API call, dynamically generate, using at least some of the user-specified parameters for the selected operation, a second invocation for the second API call;

communicating the first invocation to the first cloud provider computer system to cause execution of functionality provided by the first API call;

communicating the second invocation to the second cloud provider computer system to cause execution of functionality provided by the second API call, wherein the server computer system is configured to broker electronic network communications between the plurality of end-user devices and the plurality of disparate cloud computing systems such that communications therebetween are provided via the server computer system.

14. The method of claim 13, further comprising:
enabling users to log into the heterogeneous cloud provider access system; and
responsive to determining that a user has logged into the heterogeneous cloud provider access system, causing the server computer to send a login request to the respective cloud computing systems with which the user has accounts based on the login information stored in the configuration database.

15. The method of claim 13, wherein the application is configured to provide a user interface for displaying content of cloud storage locations provided to the respective cloud computing systems with which logged in users have accounts.

16. The method of claim 13, wherein the application enables users logged into the server to perform file management functions with respect to one or more cloud storage locations provided to the respective cloud computing systems with which logged in users have accounts.

17. The method of claim 16, wherein the file management functions that are performable include (a) copying and/or moving data among and/or between cloud storage locations provided to the respective cloud computing systems, and/or (b) copying and/or moving data from a device to cloud storage locations provided to the respective cloud computing systems, and vice versa.

18. The method of claim 13, wherein the mappings are stored in a table and/or as logic statements.

19. The method of claim 13, wherein the application enables users logged into the server to perform management and/or administrative functions with respect to one or more cloud resources provided to the respective cloud computing systems with which logged in users have accounts.

20. A non-transitory computer readable storage medium tangibly storing instructions for performing the method of claim 13.

21. The method of claim 13, wherein the functionality that is common across the plurality of disparate cloud computing systems includes at least one of: 1) reading folder properties, 2) deleting folders, 3) creating folders, 4) updating folder properties, 5) reading file properties, 6) updating file properties, 7) downloading files, 8) uploading files, 9) updating uploaded files, 10) deleting uploaded files, 11) getting links to folders and files, 12) moving folders and files, and 13) copying files.

22. A server computer system configured to communicate with a heterogeneous cloud system that includes a plurality of disparate cloud computing systems operated by different respective cloud providers, each said cloud computing system providing operations that are common across the plurality of disparate cloud computing systems, but each of the common operations implemented through differently implemented application programming interface (API) calls that are specific to the respective cloud computing system for those common operations, the API calls allowing external computing devices to interact with the respective cloud computing system for performance and/or execution of functionality provided by the respective cloud computing system, the server computer system comprising:
processing resources including at least one processor;
a connection pool configured to enable a plurality of end-user devices, which are remotely located from the server computer system with each said end user device including at least one hardware processor, to connect to the server computer system via an application installed on the respective end-user device, the application including plural user selectable operations that are independent of, but correspond to, operations that are common across the plurality of disparate cloud computing systems, each user selectable operation selectable by a user for execution and/or performance in connection with at least one of the cloud computing systems after authentication with the server, wherein the plural user selectable operations include operations that involve at least two different cloud computer systems, the operations including moving data between a first cloud computer system and a second cloud computer system of the plurality of disparate cloud computing systems and copying data from the first cloud computer system to the second cloud computer system;
electronic memory that stores a configuration database with:
a plurality of user records, each said user record being associated with login information for at least one of the plurality of disparate cloud computing systems, and
an API definition table that includes a plurality of records that are each mapped within the configuration database to at least one of the plural user selectable operations, where each record includes an API definition specific to at least one corresponding cloud computing system; and
processing resources including at least one processor, the processing resources configured to:
after one of the plurality of end-user devices has been authenticated with the server computer system, receive, from the one of the plurality of end-user devices, a first request that includes a selected one of the plural user selectable operations and user-specified parameters for the selected operation, wherein the selected one of the plural user selectable operations involves two different cloud computer systems,
responsive to reception of the selected operation, retrieve, from the configuration database, a first API call for a first cloud computer system and a second API call for a second cloud computer system,
responsive to reception of the selected operation and based on the retrieved first API call, dynamically generate, using at least some of the user-specified parameters for the selected operation, a first invocation for the first API call,
responsive to reception of the selected operation and based on the retrieved second API call, dynamically generate, using at least some of the user-specified parameters for the selected operation, a second invocation for the second API call,
communicating the first invocation to the first cloud provider computer system to cause execution of functionality provided by the first API call, and
communicating the second invocation to the second cloud provider computer system to cause execution of functionality provided by the second API call,
wherein the server computer system is configured to broker electronic network communications between the plurality of end-user devices and the plurality of disparate cloud computing systems such that communications therebetween are provided via the server computer system, wherein the execution of the separately first and second invocations causes the completion of the selected operation.

23. The server computer system of claim 22, wherein the functionality that is common across the plurality of disparate cloud computing systems includes at least one of: 1) reading folder properties, 2) deleting folders, 3) creating folders, 4) updating folder properties, 5) reading file properties, 6) updating file properties, 7) downloading files, 8) uploading files, 9) updating uploaded files, 10) deleting uploaded files, 11) getting links to folders and files, 12) moving folders and files, and 13) copying files.

* * * * *